United States Patent [19]

Dooley

[11] Patent Number: 4,545,711
[45] Date of Patent: Oct. 8, 1985

[54] TOOL USING REPLACEABLE BITS

[75] Inventor: Jimmy B. Dooley, Wilmington, N.C.

[73] Assignee: The Babcock & Wilcox Company, New Orleans, La.

[21] Appl. No.: 356,589

[22] Filed: Mar. 9, 1982

[51] Int. Cl.4 .............................................. B23B 51/00
[52] U.S. Cl. ...................................... 408/197; 407/35; 408/186; 408/227; 408/713
[58] Field of Search ............... 408/197, 222, 231, 233, 408/238, 240, 713, 146, 147, 157, 173, 178, 186, 221; 407/33, 34, 35, 43, 55, 56, 70; 10/101, 102

[56] References Cited

U.S. PATENT DOCUMENTS

| 3,125,799 | 3/1964 | Bennett | 407/35 |
| 4,038,732 | 8/1977 | Hunkeler | 407/35 X |
| 4,087,194 | 5/1978 | Takacs et al. | 408/713 |
| 4,102,594 | 7/1978 | Kress et al. | 408/186 |
| 4,265,325 | 5/1981 | Dick | 407/34 X |

FOREIGN PATENT DOCUMENTS 922027 7/1955 Fed. Rep. of Germany ...... 408/227
2152554 4/1973 Fed. Rep. of Germany ...... 408/197

Primary Examiner—William R. Briggs
Attorney, Agent, or Firm—Robert J. Edwards; James C. Simmons

[57] ABSTRACT

A milling tool for cutting internally of a bore by means of replaceable bits. The tool comprises an elongate bar member an end portion of which includes a pair of axially outer portions which extend radially outwardly from a central portion and are disposed on respectively opposite sides of the rotational axis. A pair of clamping members are detachably attached to the bar member on respectively opposite sides of the rotational axis and have axially outer portions which together with the axially outer portions of the bar member form an axially outer surface of the tool. The axially outer portions of the bar member and the clamping members cooperate to form four slots in the tool axially outer surface for clamping engagement of radially extending bits.

12 Claims, 8 Drawing Figures

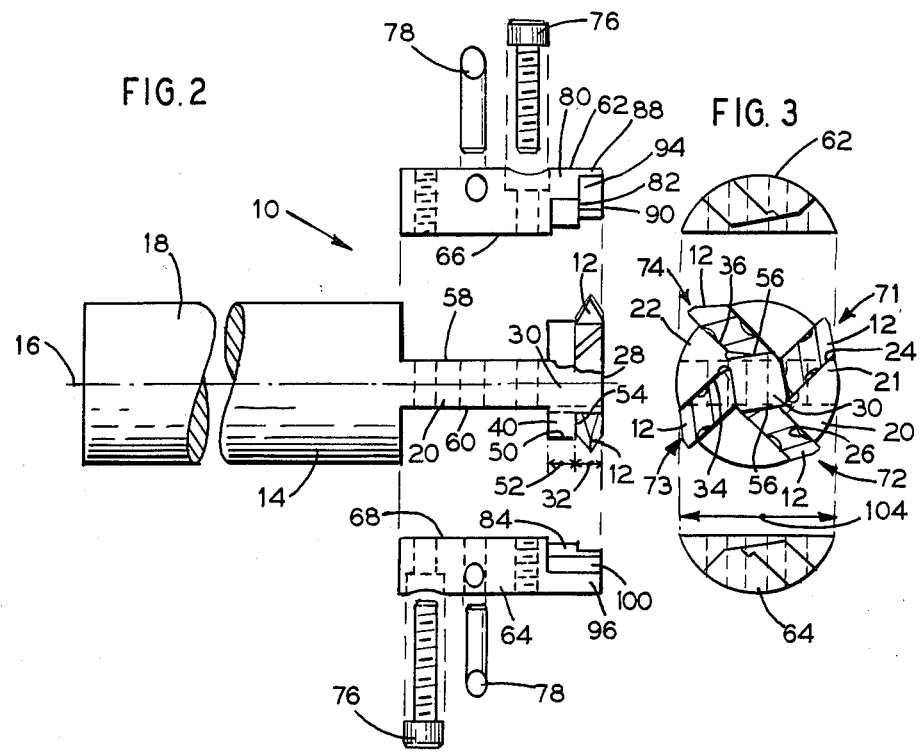
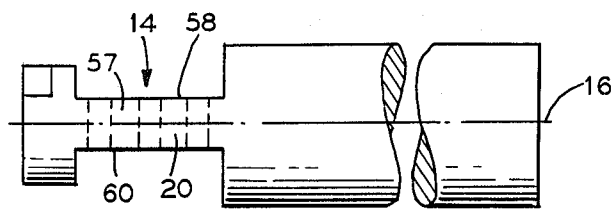
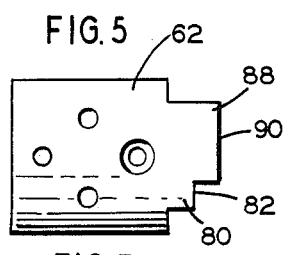 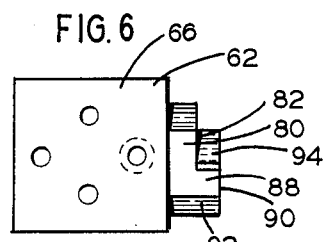
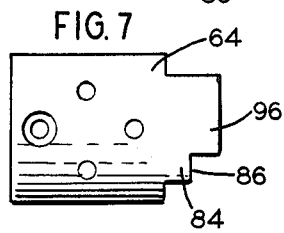 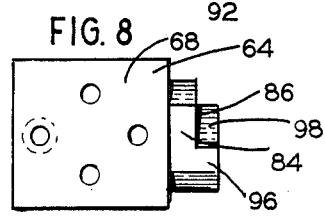

TOOL USING REPLACEABLE BITS

This invention relates to tools for cutting internally of a bore. More particularly, this invention relates to milling tools utilizing replaceable bits for cutting internally of a bore.

Replaceable bits are sometimes called indexable inserts or throw-away inserts in the machine tool industry. Such inserts come in many shapes, such as square, rectangular, and the shape of a parallelogram, and are commonly formed of carbide material to allow the tools to be turned at greatly increased speeds. Sometimes, these inserts may be produced with cutting edges on both ends thereof to allow an insert to be unclamped from its tool and its ends reversed so that the cutting edge on the other end may be used whereby greater efficiency may be achieved.

Computer numerically controlled machines (commonly called "CNC machines") have utilized taps or conventional threadmills not having replaceable bits for cutting internal threads. However, some of the smaller CNC machines often have insufficient power to operate taps over certain diameters or pitches. Since such conventional threadmills do not use replaceable bits, their cutting edges are made of tool steel or the like since an entire tool made of carbide material would be expensive. These conventional threadmills are expensive to use because a different threadmill is required for each thread pitch and a substantial amount of downtime is required for replacement of such a threadmill for sharpening since tool steel cutting edges become dull quickly. In addition, as previously indicated, these conventional threadmills must be turned at decreased speeds thus also resulting in decreased efficiency.

Tools with replaceable inserts for cutting internally of a bore are not unknown in the machine tool industry for such non-threading operations as boring, facing, and the like. In such a case, an insert may be clamped between a main body portion of such a tool and an associated clamping member with each insert requiring a separate clamping member. Fasteners may extend through the clamping member and into the body portion for holding the insert in a desired position. It has also been proposed to utilize two symetrical opposite halves to form the body of a tool which halves act as a clamp to enclose and mechanically hold the inserts. However, such a construction provides slots for holding of only two inserts, and a higher quality and more accurate thread can normally be produced by using a greater number of inserts.

It is an object of one aspect of this invention to provide an improved tool for cutting threads internally of a bore.

It is an object of another aspect of this invention to provide such a tool which requires a minimum of machine downtime for sharpening, replacement, and the like.

It is an object of still another aspect of this invention to provide such a tool which produces threads which are of higher quality and more accurate.

It is an object of yet another aspect of this invention to provide such a tool utilizing replaceable cutting bits which require little, if any, adjustment other than inserting them fully into their respective slots.

It is an object of another aspect of this invention to provide a milling tool which will hold four replaceable bits for cutting a thread internally of a small diameter bore.

The above and other objects, features, and advantages of this invention will be apparent in the following detailed description of the preferred embodiments thereof which is to be read in connection with the accompanying drawings.

IN THE DRAWINGS:

FIG. 2 is an exploded side elevation view thereof;

FIG. 3 is an exploded front end elevation view thereof;

FIG. 4 is a side elevation view of the bar member thereof;

FIG. 5 is an elevation view of one side of one clamping member thereof;

FIG. 6 is an elevation view of the other side thereof;

FIG. 7 is an elevation view of one side of the other clamping member thereof; and FIG. 8 is an elevation view of the other side thereof.

Figure 1:
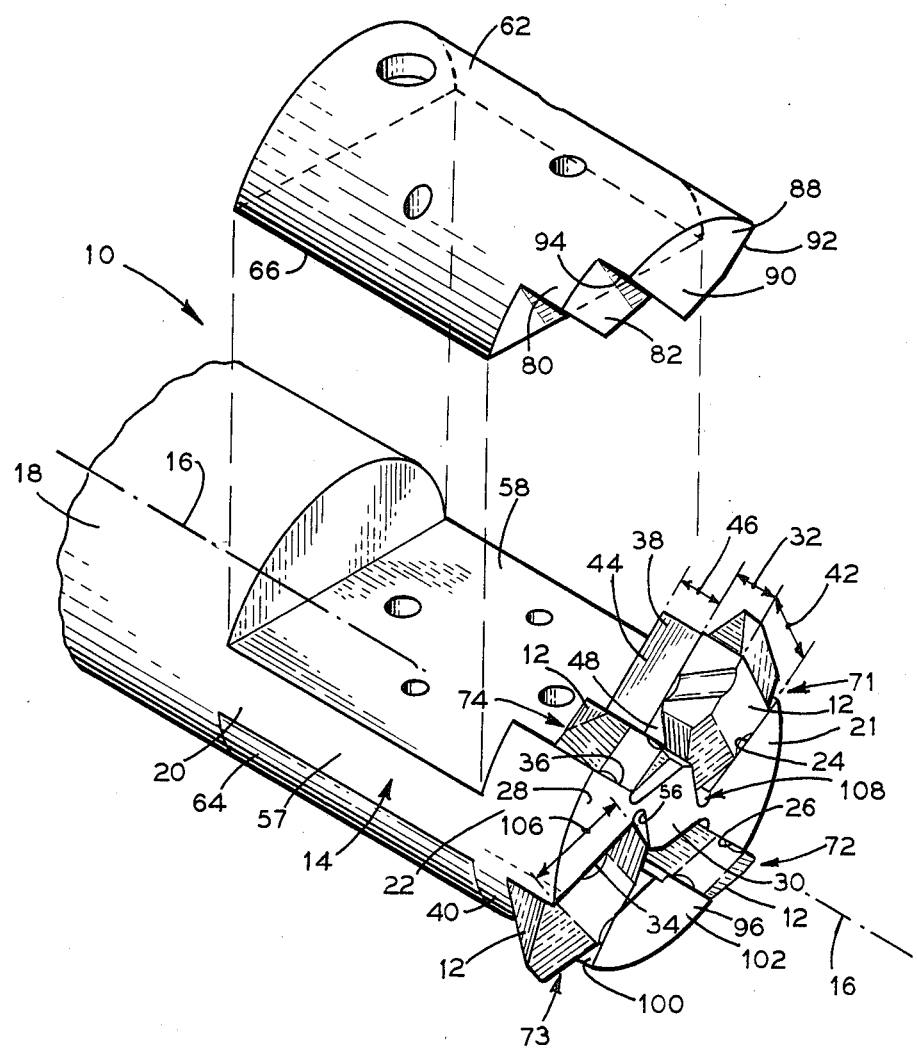
FIG. 1 is a partially exploded perspective view of a tool embodying this invention.

As best shown in FIG. 1, there is provided a milling tool 10 for clampingly engaging replaceable bits 12 in slots 71 through 74 for cutting threads internally of a bore. The tool 10 may, however, be used for other types of cutting operations such as boring and facing. Tool 10 comprises an elongate bar member 14 which has an axis illustrated at 16 extending longitudinally thereof and about which the bar member 14 rotates. A generally cylindrical shank portion 18 of the bar member 14 is provided for engagement of the bar member 14 in a chuck of a machine such as a CNC milling machine. However, it is not necessary that the shank portion 18 be cylindrical but it may be of any other suitable configuration. There is also provided on the bar member 14 an end portion 20 forward of the shank portion 18 for clampingly engaging the bits 12.

The front end portion 20 of the bar member 14 is provided with a first and a second axially outer portion 21 and 22 respectively which are disposed on opposite sides of the rotational axis 16. The first axially outer portion 21 has a first surface 24 and a second surface 26 each of which extends axially inwardly of the bar member 14 from the axially outer surface 28 of the end portion 20 and each of which extends radially of the bar member 14 from a centrally disposed axially outer portion 30 to a radially outer extremity of the end portion 20. The distance 32 over which each of these surfaces 24 and 26 extend in an axial direction is preferably equal substantially to a corresponding dimension of a bit 12 inserted into the tool 10 to thereby engage bits 12 so that they extend in an axial direction to surface 28 to permit the cutting of threads to nearly the bottom of a closed end bore. As used herein and in the claims, the terms "axial" and "axially" refer to a direction parallel to the rotational axis 16 of the bar member 14. As used herein and in the claims, the terms "radial" and "radially" refer to a direction perpendicular to the rotational axis 16 of the bar member 14. First and second surfaces 34 and 36 respectively, which are similar to the surfaces 24 and 26, respectively, are provided on the second axially outer portion 22.

One of the surfaces of the first axially outer portion 21 and a corresponding surface of the second axially outer portion 22, such as, for example, the first surfaces 24 and 34, extend axially inwardly to terminate at a pair of portions 38 and 40 respectively of end portion 20. However, in accordance with this invention, second surfaces 26 and 36 may instead terminate at such a pair of portions. In the embodiment illustrated in the drawings, portion 38 extends from the first axially outer portion 21 in a direction preferably perpendicular to surface 24 and terminates at a surface 44. Surface 44 extends from the centrally disposed axially outer portion 30 radially outwardly to an extremity of the bar member 14 and extends over a distance in the axial direction illustrated at 46. Another surface 48 of portion 38 extends between surface 44 thereof and the first surface 24 of the first axially outer portion to provide an axially inner limit or boundary to a slot 71 for insertion of a cutting bit. Likewise, portion 40 extends from the second axially outer portion 22 in a direction preferably perpendicular to surface 34 and terminates at surface 50. Surface 50 extends from the centrally disposed axially outer portion 30 radially outwardly to an extremity of the bar member 14 and extends over a distance in the axial direction illustrated at 52. Another surface 54 of portion 40 extends between surface 50 thereof and the first surface 34 of the second axially outer portion. Each of the surfaces 48 and 54 is preferably perpendicular to the rotational axis 16 of the bar member and extends over a distance illustrated at 42 in FIG. 1, in a direction normal to respective surfaces 24 and 34 which is preferably equal substantially to or slightly less than a corresponding dimension of standard size bits 12 inserted in the tool 10.

The centrally disposed axially outer portion 30 preferably has four surfaces 56 which extend axially inwardly from surface 28 to provide the radially inner boundaries of slots for insertion of bits. These surfaces 56 are preferably equally distant from rotational axis 16 for alignment of bits in the slots 71 through 74 in respective radial directions. In a cross section taken in a radial plane, the centrally disposed axially outer portion 30 preferably has the shape of a rhombus.

A generally flat portion 57 of the bar member 14 extending axially outwardly from the rear shank portion 18 provides a pair of generally parallel surfaces 58 and 60 which extend between portions 21, 22, 38, and 40 and the shank portion 18. These surfaces 58 and 60 are disposed on opposite sides of and are preferably parallel to the rotational axis 16 of the bar member. A first 58 of these surfaces is preferably generally circumferentially aligned with the first surface 24 of the first axially outer portion. A second 60 of these parallel surfaces is preferably generally circumferentially aligned with the first surface 34 of the second axially outer portion.

In accordance with an aspect of this invention, there is also provided a pair of clamping members 62 and 64 which are detachably attached to the front end portion 20 at respective parallel surfaces 58 and 60 and which are constructed to extend axially outwardly approximately to surface 28 and to form with the front end portion 20 the four slots 71 through 74 for clamping engagement of radially extending bits 12. A first 62 of the clamping members has a surface 66 which mates with and engages the first parallel surface 58, and a second clamping member 64 has a surface 68 which mates with and engages the second parallel surface 60. Means such as machine bolts 76 and pins 78 inserted through one of the clamping members, through the portion 57, and into the other of the clamping members are provided for aligning and securing the clamping members 62 and 64 to the end portion of the bar member.

First clamping member 62 has a portion 80 which, when member 62 is attached to the bar member 14, extends axially outwardly from surface 58 and extends circumferentially between surface 44 of portion 38 and the second surface 36 of the second axially outer portion. Clamping member portion 80 has an axially outer surface 82 which extends to the second surface 36 and is preferably perpendicular to the rotational axis 16 to provide an axially inner boundary to slot 74 to limit movement of a bit for its alignment in an axial direction in the tool.

Another portion 88 of the first clamping member 62 extends axially outwardly from portion 80 to an axially outermost surface 90. Extending axially outwardly from surface 48 of portion 38 to surface 90 is a first clamping surface 92 of the first clamping member 62 which surface also extends radially from the centrally disposed axially outer portion 30 to an outer extremity of the bar member 14 to provide a boundary of slot 71. Extending axially outwardly from surface 82 of clamping member portion 80 to surface 90 while also extending radially from the centrally disposed axially outer portion 30 to an outer extremity of the bar member 14 is a second clamping surface 94 which provides a boundary of another slot 74.

Likewise and similarly, second clamping member 64 has a portion 84 extending axially outwardly from surface 60 and extending circumferentially between surface 50 of portion 40 and the second surface 26 of the first axially outer portion. Clamping member portion 84 also has an axially outer surface 86 which extends to the second surface 26 and is preferably perpendicular to the rotational axis 16 to provide an axially inner boundary to slot 72 for alignment of a bit in slot 72 in an axial direction. Second clamping member 64 is provided with another portion 96 which extends axially outwardly from portion 84 to axially outer surface 102 and provides a first clamping surface 98 which extends from surface 86 of portion 84 to the axially outer surface 90 and radially from the centrally disposed axially outer portion 30 to an extremity of the tool to provide a boundary of another slot 73. A second clamping surface 100 of the second clamping member 64 extends from surface 54 of portion 40 axially outwardly to surface 102 and also extends radially from centrally disposed axially outer portion 30 to an extremity of the bar member 14 to provide a boundary of another slot 73.

When the clamping members 62 and 64 are attached to the end portion 20, the axially outer surfaces 90 and 102 of the clamping members form with the axially outer surface 28 of the end portion of the bar member what is defined for the purposes of this specification and the claims as an axially outer surface of the tool. However, these surfaces 28, 90, and 102 need not be axially aligned. For example, an axially outer surface of one or both of the clamping members may be disposed slightly axially inwardly or axially outwardly of surface 28. However, in order that threading may be performed with the tool 10 as close as possible to the bottom of a closed end bore, surfaces 90 and 102 are preferably axially aligned with each other.

In accordance with an aspect of this invention, when the clamping members 62 and 64 are attached to the end portion 20, they form with the end portion the four slots 71 through 74 in the tool axially outer surface for clamping engagement of bits 12 between respective surfaces of the clamping members and respective surfaces of the bar member to thereby provide four thread cutting bits for faster thread cutting internally of a bore and for higher quality and more accurate threads than would be achieved if less than four bits were provided. These bits 12 are aligned to extend radially outwardly from a respective surface 56 of the centrally disposed axially outer portion and beyond respective extremities of the tool 10 at points which are proportionately spaced apart around the tool 10. Each of these slots 71 through 74 is therefore open axially outwardly and radially outwardly thereof, and is bounded radially inwardly thereof by one of the four surfaces 56 of the centrally disposed axially outer portion to provide alignment of each of the bits in the radial direction.

First slot 71 is bounded axially inwardly thereof by surface 48 of portion 38 for alignment of a bit 12 in an axial direction, and is further bounded by the first surface 24 of the first axially outer portion on one side and the first clamping surface 92 of the axially outer portion of the first clamping member on the other side for clamping engagement of a bit 12 between the first axially outer portion 21 and the first clamping member 62 to fixedly align and clamp the bit therein.

Second slot 72 is bounded axially inwardly thereof by surface 86 of portion 84 of the second clamping member for alignment of a bit 12 in an axial direction, and is further bounded by the second surface 26 of the first axially outer portion on one side and the first clamping surface 98 of the second clamping member on the other side for clamping engagement of the bit 12 between the second clamping member 64 and the first axially outer portion 21 to fixedly align and clamp the bit therein.

Third slot 73 is bounded axially inwardly thereof by surface 54 of portion 40 for alignment of a bit 12 therein in an axial direction, and is further bounded by the second clamping surface 100 of the second clamping member on one side and the first surface 34 of the second axially outer portion on the other side for clamping engagement of the bit 12 between the second clamping member 64 and the second axially outer portion 22 to fixedly align and clamp the bit therein.

Fourth slot 74 is bounded axially inwardly thereof by surface 82 of portion 80 of the first clamping member for alignment of a bit 12 in an axial direction, and is further bounded by the second clamping surface 94 of the first clamping member on one side and the second surface 36 of the second axially outer portion on the other side for clamping engagement of the bit 12 between the first clamping member 62 and the second axially outer portion 22 to fixedly align and clamp the bit therein.

Each of the surfaces 48, 86, 54, and 82 are preferably perpendicular to the rotational axis 16 and are preferably axially aligned with each other for alignment of bits in the slots 71 through 74 in an axial direction with little, if any, adjustment of their positions required.

It is clearly evident from FIG. 1 that the tool 10 provides slots for four radially extending thread cutting bits while providing a minimum diameter so that internal threads may be cut in bores having diameters which would otherwise not permit such thread cutting with tools which hold replaceable bits in conventional manners. For example, a tool diameter 104 at the slots of one inch (2.54 cm.) has been found to be satisfactory for providing four slots each of which has a length 106 of approximately 0.375 inch (0.96 cm.).

The respective surfaces 24, 26, 34, and 36 on the axially outer portions of the bar member and the clamping surfaces 92, 94, 98, and 100 on the clamping members are preferably skewed, as viewed in a cross-section taken in a radial plane, by substantially equal amounts such as, for example, 45 degrees to the respective surfaces 56 on the centrally disposed axially outer portion of the bar member to provide a suitable negative rake. This angle as well as the various tolerances which may be required for construction of the tool 10 can be determined by applying mathematical and engineering principles of common knowledge to one of ordinary skill in the art to which this invention pertains.

In accordance with another preferred embodiment of this invention, a groove, illustrated at 108 in FIG. 1, is formed in each of the surfaces 24 and 34 on respective axially outer portions of the bar member and clamping surfaces 94 and 98 on respective axially outer portions of clamping members at the intersection of the surface with a respective surface 56 of the centrally disposed axially outer portion of the bar member in order to dispose a reversible replacement bit in a respective slot so that a cutting edge on one end thereof is protected when the cutting edge on the opposite end is in use.

Certain features of this invention may sometimes be used to advantage without a corresponding use of the other features. It is also to be understood that the invention is by no means limited to the specific embodiments which have been illustrated and described herein, and that various modifications may indeed be made within the scope of the present invention as defined by the appended claims.

I claim:

1. A milling tool for cutting internally of a bore by means of replaceable bits, the tool comprising an elongate bar member having a rotational axis, a shank portion on said bar member, an end portion on said bar member which end portion includes a centrally disposed axially outer portion and a pair of axially outer portions disposed on respectively opposite sides of said rotational axis and extending radially outwardly from said centrally disposed portion, a pair of clamping members detachably attached to said end portion on respectively opposite sides of said rotational axis and forming with said end portion an axially outer surface of the tool and including axially outer portions which form with said axially outer portions of said bar member four slots in said surface for clamping engagement of radially extending bits, means for detachably attaching said clamping members to said end portion, and means for clamping a bit in each of two of said slots between a respective surface of said axially outer portion of one of said pair of clamping members and a respective surface of said radially extending axially outer portions respectively of said end portion and for clamping a bit in each of the other two of said slots between a respective surface of said axially outer portion of the other of said pair of clamping members and a respective surface of said radially extending axially outer portions respectively of said end portion.

2. A tool according to claim 1 wherein said bar member end portion comprises a pair of axially outer portions disposed on opposite sides of said rotational axis and each of which has a pair of surfaces which extend axially inwardly from said axially outer surface of the tool to partially form each of a pair of said slots respectively, and each of said clamping members comprises an axially outer portion extending between one of a first pair of said slots and one of a second pair of said slots respectively and which axially outer portion has a pair of surfaces which extend axially inwardly from said axially outer surface of the tool to partially form one of said first pair of slots and one of said second pair of slots respectively for clamping of a bit in each said respective slot between one of said axially outer portions of said bar member and said axially outer portion of one of said clamping members.

3. A tool according to claim 2 wherein said end portion of said bar member further comprises a pair of surfaces disposed on opposite sides of said rotational axis and each of which is perpendicular to said rotational axis, spaced axially inwardly from said axially outer surface of the tool, and extends between one of said axially extending surfaces on said respective axially outer portion of said end portion and one of said axially extending surfaces on said respective clamping member to limit movement of a respective bit in an axial direction for axial alignment thereof, and each said clamping member further comprises a surface which is perpendicular to said rotational axis, spaced axially inwardly from said axially outer surface of the tool, and extends between the other one of said axially extending surfaces on said respective clamping member and the other one of said axially extending surfaces on said respective axially outer portion of said end portion to limit movement in an axial direction of another corresponding bit for axial alignment thereof.

4. A tool according to claim 3 wherein said end portion comprises a centrally disposed axially outer portion which has four axially inwardly extending surfaces which form radially inner boundaries to said slots and which are equally distant from the rotational axis of the tool for alignment of bits in said slots in a radial direction.

5. A tool according to claim 4 wherein said axially extending surfaces on said axially outer portions of said bar member and said axially extending surfaces on said clamping members are substantially equally skewed to said respective surfaces on said centrally disposed axially outer portion of said bar member and said centrally disposed portion is rhombus-shaped when the tool is viewed in a cross-section taken in a radial plane.

6. A tool according to claim 4 further comprising means forming a groove radially inwardly of at least one of said slots, said groove formed in either said respective axially extending surface on said axially outer portion of said bar member or said respective axially extending surface on said axially outer portion of said respective clamping member at the intersection with said respective axially extending surface of said centrally disposed axially outer portion of said bar member for disposing a reversible bit in said slot so that a cutting edge thereof is protected.

7. A tool according to any one of claims 3 or 4 wherein the tool is a thread mill and each of said surfaces which are perpendicular to the rotational axis are axially aligned with each other for alignment of bits in said slots in an axial direction.

8. A milling tool for cutting internally of a bore by means of replaceable bits, the tool comprising an elongate bar member having a rotational axis, a shank portion on said bar member, an end portion on said bar member, a pair of clamping members detachably attached to said end portion on respectively opposite sides of said rotational axis and forming with said end portion an axially outer surface of the tool and four slots in said surface for clamping engagement of radially extending bits, means for detachably attaching said clamping members to said end portion, said end portion comprises a first axially outer portion extending between a first and a second of said slots and having a first surface which extends axially inwardly from said tool axially outer surface to partially form said first slot and a second surface which extends axially inwardly from said tool axially outer surface to partially form said second slot, and a second axially outer portion extending between a third and a fourth of said slots and having a first surface which extends axially inwardly from said tool axially outer surface to partially form said third slot and a second surface which extends axially inwardly from said tool axially outer surface to partially form said fourth slot, a first of said clamping members comprises an axially outer portion extending between said first and fourth slots and having a first surface which extends axially inwardly from said tool axially outer surface to partially form said first slot for clamping of a bit between said axially outer portion of said first clamping member and said first axially outer portion of said bar member, said first clamping member axially outer portion further has a second surface which extends axially inwardly from said tool axially outer surface to partially form said fourth slot for clamping of a bit between said axially outer portion of said first clamping member and said second axially outer portion of said bar member, a second of said clamping members comprises an axially outer portion extending between said second and third slots and having a first surface which extends axially inwardly from said tool axially outer surface to partially form said second slot for clamping of a bit between said axially outer portion of said second clamping member and said first axially outer portion of said bar member, and said second clamping member axially outer portion further has a second surface which extends axially inwardly from said tool axially outer surface to partially form said third slot for clamping of a bit between said axially outer portion of said second clamping member and said second axially outer portion of said bar member.

9. A tool according to any one of claims 1, 2, 3 or 8 wherein said end portion of said bar member includes an axially inner portion having a pair of axially extending parallel surfaces for engagement with respective mating surfaces on said clamping members, and the tool further comprises means for aligning said clamping members to said end portion of said bar member.

10. A tool according to any one of claims 1, 2, 3 or 8 wherein the tool has a diameter at said slots which is less than about three times a length of one of said slots.

11. A tool according to any one of claims 1, 2, 3 or 8 wherein the tool is a thread mill.

12. A tool according to claim 8 wherein said end portion of said bar member further comprises a pair of surfaces disposed on opposite sides of said rotational axis and each of which is perpendicular to said rotational axis, spaced axially inwardly from said axially outer surface of the tool, and extends between one of said axially extending surfaces on said respective axially outer portion of said end portion and one of said axially extending surfaces on said respective clamping member to limit movement of a respective bit in an axial direction for axial alignment thereof, and each said clamping member further comprises a surface which is perpendicular to said rotational axis, spaced axially inwardly from said axially outer surface of the tool, and extends between the other one of said axially extending surfaces on said respective clamping member and the other one of said axially extending surfaces on said respective axially outer portion of said end portion to limit movement in an axial direction of another corresponding bit for axial alignment thereof.

* * * * *